(12) United States Patent
Thistle (10) Patent No.: US 9,447,659 B2
(45) Date of Patent: Sep. 20, 2016

(54) TOOL FOR UNSEIZING AND LUBRICATING WELL VALVES, AND METHOD OF UNSEIZING SAID VALVES

(71) Applicant: Progressive Oilfield Services Ltd., Strathmore (CA)

(72) Inventor: Scott Thistle, Strathmore (CA)

(73) Assignee: Progressive Oilfield Services Ltd., Alberta (CA)

( * ) Notice: Subject to any disclaimer, the term of this patent is extended or adjusted under 35 U.S.C. 154(b) by 209 days.

(21) Appl. No.: 14/325,113

(22) Filed: Jul. 7, 2014

(65) Prior Publication Data
US 2016/0003006 A1 Jan. 7, 2016

(30) Foreign Application Priority Data
Jul. 4, 2014 (CA) ..................... 2855789

(51) Int. Cl.
| | |
|---|---|
| *E21B 41/00* | (2006.01) |
| *B08B 9/00* | (2006.01) |
| *F16N 5/00* | (2006.01) |
| *F16N 21/00* | (2006.01) |
| *F16K 3/36* | (2006.01) |
| *E21B 34/02* | (2006.01) |

(52) U.S. Cl.
CPC .............. *E21B 41/00* (2013.01); *B08B 9/00* (2013.01); *E21B 34/02* (2013.01); *F16K 3/36* (2013.01); *F16N 5/00* (2013.01); *F16N 21/00* (2013.01); *Y10T 137/043* (2015.04); *Y10T 137/4259* (2015.04)

(58) Field of Classification Search
CPC ........ E21B 41/00; E21B 34/02; F16N 21/00; F16N 5/00; F16K 3/36; Y10T 137/0419; Y10T 137/0424; Y10T 137/043; Y10T 137/0441; Y10T 137/048; Y10T 137/0486; Y10T 137/4259; B08B 9/00
USPC ................ 251/355; 137/15.04–15.06, 15.08, 137/15.16–15.17, 240
See application file for complete search history.

(56) References Cited

U.S. PATENT DOCUMENTS

| | | | | |
|---|---|---|---|---|
| 2,337,841 A | * | 12/1943 | Shafer | ................ F16K 31/363 137/553 |
| 3,107,685 A | * | 10/1963 | Scaramucci | ............. F16K 3/28 137/327 |

(Continued)

*Primary Examiner* — John Bastianelli
(74) *Attorney, Agent, or Firm* — Foley & Lardner LLP (57) ABSTRACT

A tool for unseizing and/or lubricating a valve having a protruding valve stem on an exterior periphery. The tool possesses a hollow tubular member, having at one end thereof an open, hollow, cylindrical flexible member adapted to be placed over and contain therewithin a portion of the valve stem. A circumferential tightening member, encircling one end of the flexible member, is provided, to permit the flexible member to sealingly engage the valve stem about the outer periphery thereof when the flexible member is placed over the valve stem. The tool further possesses a fluid inlet port, situated along a length of the tubular member, in fluid communication with an interior of the tubular member, and a pressurized fluid inlet port likewise in fluid communication with the interior of the tool. A method for un-seizing and/or lubricating such valve, making use of the above tool, is further disclosed and claimed.

3 Claims, 7 Drawing Sheets

(56) References Cited

U.S. PATENT DOCUMENTS

| | | | | |
|---|---|---|---|---|
| 3,990,679 A * | 11/1976 | Boitnott | ............... | F16J 15/006 251/214 |
| 4,029,294 A * | 6/1977 | McCaskill | ............... | F16K 3/36 137/246.12 |
| 4,230,299 A * | 10/1980 | Pierce, Jr. | ............... | E21B 34/02 137/315.28 |
| 4,340,204 A * | 7/1982 | Herd | ............... | F16K 3/36 251/214 |
| 4,516,752 A * | 5/1985 | Babbitt | ............... | F16J 15/186 251/214 |
| 4,903,719 A * | 2/1990 | Rains | ............... | F16K 27/006 137/15.17 |
| 4,955,404 A * | 9/1990 | Pitzen | ............... | F16K 43/00 137/15.11 |
| 5,244,183 A * | 9/1993 | Calvin | ............... | F16J 15/004 137/312 |
| 5,341,835 A * | 8/1994 | Lanning, II | ............... | F16K 3/0227 137/246.22 |
| 2014/0124298 A1 | 5/2014 | He et al. | | |

* cited by examiner

TOOL FOR UNSEIZING AND LUBRICATING WELL VALVES, AND METHOD OF UNSEIZING SAID VALVES

CLAIM OF BENEFIT TO PRIORITY

This application claims priority to Canadian Patent Application No. 2855789 filed Jul. 4, 2014 which is incorporated herein by reference in its entirety.

FIELD OF THE INVENTION

The present invention relates to well valves, and in particular to a tool for de-rusting and lubricating such valves, and a method of un-seizing valves which are seized.

BACKGROUND OF THE INVENTION AND DESCRIPTION OF PRIOR ART

Valves for regulating flow of liquids and gases in relatively large diameter pipes are typically gate valves and butterfly valves.

Stem valves, which may include butterfly valves and gate valves having rising and non-rising stems, are widely used as oil field valves for production of oil and gas. Such valves are typically situated outdoors and are thus exposed to elements such as rain and snow, and further often regulate flow of oil and gas which may contain fluids [which in an unrefined state contain impurities such as sour gas (hydrogen sulfide)] which may cause corrosion and thus seizure of internal moveable valve components. A further exacerbating factor and serious problem in and of itself is that valves of this type are frequently located in remote oilfield locations, and are thus not able to be lubricated regularly and maintained.

Accordingly, even though such valves have a greasing zerk to allow lubrication, frequently due to lack of regular lubrication seizure of such valves and resulting inability to open or close such valves is a serious problem.

Once seized, such valves must often be disconnected from the wellhead equipment and replaced. Replacing such valves is not an easy task, requiring service professionals, and moreover transporting such service professionals and equipment to remote locations to carry out such task. Accordingly, replacement of seized valves by removal requires a substantial cost.

Even though some valves, depending on their condition, once removed can be disassembled and reconditioned at a service facility, the servicing cost is likewise high, to say nothing of the cost of removing the valve and replacing with a re-conditioned valve, and thereafter transporting the seized valves to a service facility for reconditioning.

Accordingly, a real need exists, particularly in the oil-patch, for a tool and method that allows unseizing of seized valves of this type in-situ, without having to remove such valves and re-install a reconditioned unit and transport the seized valve to a reconditioning facility.

US Publication 2014/0124298, having a common inventor with the invention herein, teaches a tool and method for unseizing seized valves, in situ, to thereby avoid having to remove such seized valves from piping on which they are installed, for servicing.

Figure 3:
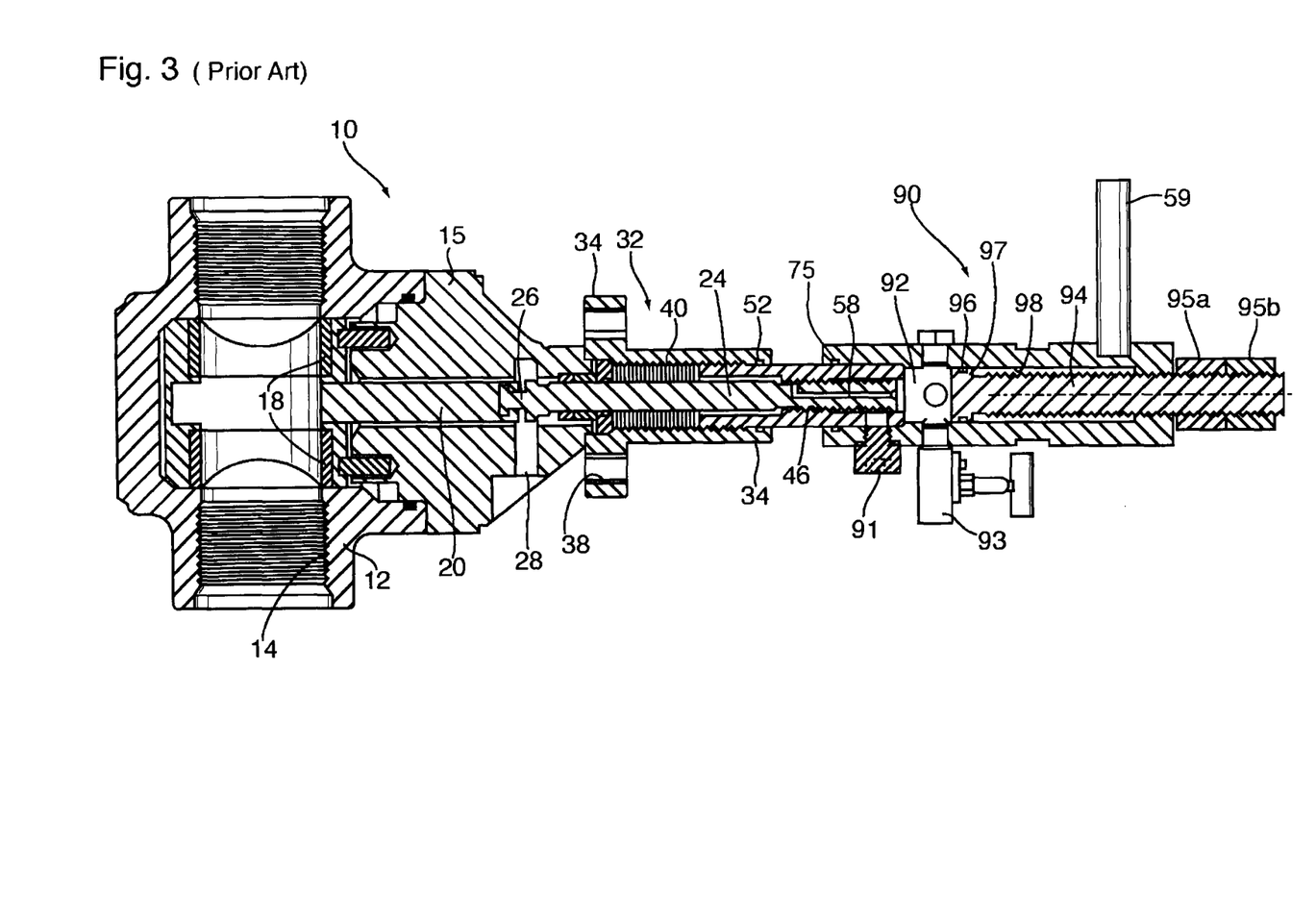
FIG. 3 is a side cross-sectional view of the prior art gate valve shown in FIG. 1, further showing the handle of such valve removed and a prior art tool as disclosed in US 2014/0124298 pinned to such valve in place of such handle.
Figure 4:
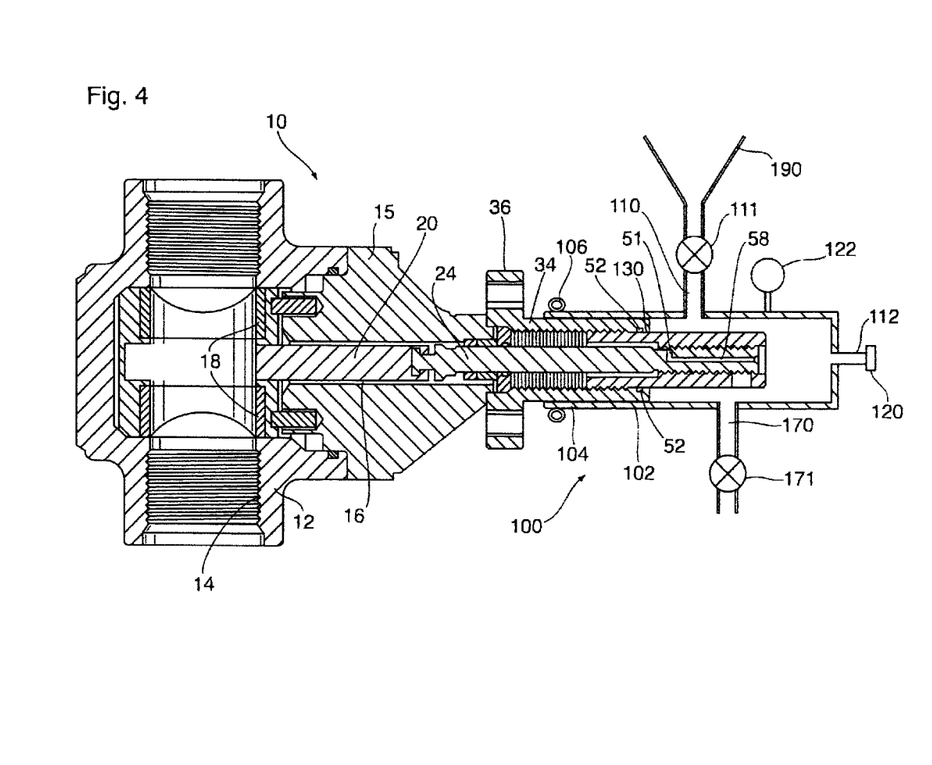
FIG. 4 is a view of a prior art gate valve having one embodiment of the tool of the present invention installed thereon.

Specifically, as may be seen from FIGS. 3 & 4 of US Pub. 2014/0124298, the tool 63 taught therein comprises a housing 65 having a moveable piston 85 within a bore 71 of tool 63. Tool 63 may be pinned to the rotating member of the valve 11 to which the valve handle 59 was formerly affixed. Piston 85, when the tool 63 is pinned to the rotating member actuator 45) of valve stem 33, may be used to first inject a solvent into the body of the valve 11 to unseize threaded components (such as the actuator 45 of the valve 11), and thereafter upon the valve thereby becoming unseized, the tool may further be the used to inject grease into the valve 11 via a greasing zert. Thereafter, tool 63 may be unpinned from the rotating member (actuator 45) of the valve 11, and the handle 59 re-attached to valve 11 to thereafter allow normal opening and closing of unseized valve 11.

Disadvantageously, however, the tool and method disclosed in US Publ. 2014/0124298 only indirectly, through flow of solvent through a circuitous route, provides solvent or grease to actuator member 45 on valve stem 33, particularly if threads on actuator are significantly corroded and does not force such fluid/grease directly onto threads on valve actuator member via injection across a valve seal 53 within valve stem 33 of valve 11 to thereby unseize such threads and actuator. Alternatively, de-rusting fluid, penetrating solvent and/or grease, when injected by piston 85 into greasing zert (injection passage 49) flows out over valve seal 53 if worn following the path of least resistance, particularly if other areas of the valve are more corroded, and fails to penetrate regions of the valve which may be heavily corroded, such as the slidable gate member 25 of valve 11, thus failing to allow the de-rusting fluid and/or penetrating solvent to unseize the seized areas of the valve.

Further disadvantageously, the tool 63 disclosed in US Publ. 2014/0124298, at least in the form as commercialized, is inoperable should the valve be seized in the fully closed position. Specifically, while tool 63 may be pinned to the rotating member of the valve 11 forming part of the rising stem of valve 11 is in the slightly open to fully open position, when such rotating member (and thus the valve 11) are in the fully closed position, due to the depth of the tool 63 and the foreshortened distance of exposed rotating member, in its commercialized format the tool 63 is then unable to be pinned to valve 11, and is thus inoperable and ineffective in rendering operable and lubricating valves in such condition.

Accordingly, a real need exists in the oil patch for a tool and method which is able to better force penetration of de-rusting fluid or penetrating oil to render movable seized valve components in seized valves, and thereafter be able to likewise supply grease to such areas.

SUMMARY OF THE INVENTION

In order to overcome the deficiencies and shortcomings of the tool and method disclosed in US Pub. 2014/0124298, the present tool and method of the present invention utilizes a novel design and method to eliminate a potential path of least resistance and ensure supply of penetrating solvent or de-rusting fluid to all moveable elements within the interior of the valve, to thereby better un-seize valves which may have substantial corrosion and have become seized.

The tool further, when grease is later injected using the tool and method of the present invention, better ensures application of such grease to all internal moveable areas of the valve than does the tool taught in US Pub. 2014/0124298.

More particularly the tool and method of the present invention provides a tool having a hollow tubular body which may be placed over not only the greasing zert of a valve, but also over the valve stem of the valve, so that upon injection of pressurized penetrating solvent or de-rusting fluid to the interior of the tool, such fluids will be caused to flow into the interior of the valve via not only the greasing zert, but also (or if the greasing zert is blocked) into the valve body via another potential route, namely over seals present in the interface between the rotatable actuator of the valve and the stationary valve stem of the valve, particularly in cases where such seals may have become worn, and thereby cause such penetrating solvent and/or de-rusting fluid to contact or better contact additional moveable components of the valve which may have become corroded and seized, and thus better un-seize any rusted or corroded seized valves.

The present invention, using such design and method, is then able to provide injection of penetrating solvent, de-rusting fluid and/or grease into multiple channels simultaneously, to thereby prevent a path of least resistance detracting from complete injection of such fluids into all moveable regions of the valve.

Accordingly, in one broad aspect of the present invention, such invention comprises a tool for unseizing and/or lubricating a valve, said valve being of a type having a valve stem or cylindrical housing on an exterior periphery, said tool comprising:

- a hollow tubular member, having at one end thereof an open, hollow, cylindrical flexible member adapted to be placed over and contain therewithin a portion of said valve stem and/or said cylindrical housing;
- a circumferential tightening member, encircling said one end of said flexible member so as to cause said flexible member at said one end, when placed over said portion of said valve stem or cylindrical housing and said circumferential tightening member is actuated, to sealingly engage said valve stem or cylindrical housing about said exterior periphery thereof;
- a fluid inlet port, situated along a length of said tubular member, in fluid communication with an interior of said tubular member; and
- a pressurized fluid inlet port, situated along a length of said tubular member or at an end opposite said one end, said pressurized fluid inlet having coupling means to allow supply of a pressurized fluid to said interior of said tubular member.

The tool as disclosed above may further possess a fluid drain port, situated along a length of the tubular member and in fluid communication with an interior of said tubular member, to allow draining of penetrating solvent, de-rusting fluid, and/or lubricating fluid from the interior of such tool.

The pressurized fluid inlet port and said fluid inlet port may be one and the same, and switching means such as a hand-operated valve, to allow said fluid inlet port to be in communication with, alternatively, atmospheric pressure or a fluid under pressure.

Alternatively, the pressurized fluid inlet port and said fluid inlet port are separate and discrete ports, each in fluid communication with said interior of said tubular member. Each may be provided with separate valves to allow separate opening and closing of each of the fluid inlet port and the drain port.

A pressure gauge may further be supplied which measures and displays pressure of fluid within said interior of said tubular member, which is useful in the method of the invention as further elaborated upon below.

The tool of the present invention is not limited to acting on, but is suited to be used on, a valve having a greasing zert, and in such application the tubular member is of a length sufficient to fit over both said greasing zert and the valve stem of the valve to thereby sealingly engage both, so as to provide two channels of potential supply of penetrating solvent or de-rusting fluid to the interior of the valve, namely when the circumferential tightening member is actuated and a source of pressurized fluid supplied to the tool, said fluid is supplied under equal pressure to both said greasing zert and to said valve stem, and in particular to an interface surface between a stationary portion of said valve stem and a rotatable portion of said valve situated within said valve stem.

In a preferred embodiment where the valve is installed in piping in which the valve stem of the valve is horizontal, and the tool is adapted to be installed over the valve stem, the fluid inlet port on the tool is positioned on a mutually opposite side of said tool in which said fluid drain is positioned, and preferably in such application the fluid inlet port of such tool is positioned on an upper side of said tubular member and said fluid drain port is positioned on a lower side of said tubular member when the tubular member is placed about the exterior periphery of the valve.

In another broad aspect of the tool of the present invention for de-rusting and/or lubricating a valve, wherein the valve is of a type having a greasing zert and a valve stem, said valve stem having an interface surface between a stationary portion of said valve stem and a rotatable portion of said valve stem, such tool comprises:

- a hollow tubular member, having at one end thereof an open, hollow, flexible member adapted to be placed over an outer periphery of said valve stem, said greasing zert, and said interface surface;
- a circumferential tightening member, encircling said one end of said tubular member so as to cause said tubular member, when said one end thereof is placed over said exterior periphery of said valve stem, said interface surface, and said greasing zert, and said circumferential tightening member is actuated, to sealingly engage said gate valve about said outer periphery thereof;
- a fluid inlet port, situated along a length of said tubular member, in fluid communication with an interior of said tubular member;
- a pressurized fluid inlet port, having coupling means to allow supply of a pressurized fluid to said interior of said tubular member and to both said greasing zert and said interface surface.

In another broad aspect, the present invention comprises a method for unseizing and/or lubricating a valve of a type having a handle, a greasing zert and a valve stem, said valve stem having an interface surface between a stationary portion of said valve stem and a rotatable portion of said valve stem, such method comprising the steps of:

(i) removing the handle of said valve from said valve;
(ii) placing a hollow tubular member, having at one end an open, hollow, flexible member, in sealing engagement over a portion of an outer periphery of said valve stem, said greasing zert, and said interface surface, so that said interface surface and said greasing zert are sealed within an interior of said hollow tubular member;
(iii) providing a rust removal and/or penetrating fluid to an interior of said hollow tubular member and causing said fluid to surround said greasing zert and said interface surface;
(iv) providing said fluid under pressure to said interior of said tubular member and causing said fluid to enter said greasing zert and/or said interface surface and thereby flow into an interior of said valve;
(v) removing the tubular member from sealing engagement with said valve stem, re-attaching the handle to the valve, and rotating the handle to unseize the valve; and (vi) providing, under pressure, a lubricating medium to said interior of said tubular member and causing said lubricating medium to flow into said greasing zert and/or said interface surface.

Finally, in another broad aspect of the method of unseizing and/or lubricating a seized valve of a type having a handle, a greasing zert and a valve stem, said valve stem having an interface surface between a stationary portion of said valve stem and a rotatable portion of said valve stem, such method comprises the steps of:

(i) positioning the valve in as fully open a position, if possible, and thereafter removing the handle;

(ii) placing a hollow tubular member, namely one end thereof having an open, hollow, flexible member, in sealing engagement over a portion of an outer periphery of said valve stem, said greasing zert, and said interface surface, so that said interface surface and said greasing zert are sealed within an interior of said hollow tubular member;

(iii) providing a rust removal and/or penetrating fluid to an interior of said hollow tubular member and causing said fluid to surround said greasing zert and said interface surface;

(iv) providing said fluid under pressure to said interior of said tubular member and causing said fluid to enter said greasing zert and said interface surface and thereby flow into an interior of said valve;

(v) removing the hollow tubular member from sealing engagement with said outer periphery of said valve stem, re-attaching the handle, and rotating e the handle so as to close and open the valve to thereby ensure the valve is unseized;

(vi) rotating the handle to the fully open position, and removing the handle from the valve;

(vii) pumping grease into said greasing zert.

Such method, after step (vi), may further comprise the steps of:

(a) re-installing the hollow tubular member, namely said one end of the open hollow flexible member and placing said one end in sealing engagement over said portion of said outer periphery of said valve stem, greasing zert, and interface surface; and (b) injecting grease into said interior of said tubular member, and causing said grease to be injected into said greasing zert and interface surface.

The tool and method of the present invention is easy to use and works well to unfreeze and lubricate oil field valves. Freeing up valves that have seized up greatly reduces the cost of replacing the valves. The servicing of such seized valves can be done on site, while the valve is still coupled to wellhead equipment.

The above summary of various aspects and embodiments of the invention does not necessarily describe the entire scope of the present invention. Other aspects, features and advantages of the invention will be apparent to those of ordinary skill in the art upon a proper review of the entire description of the invention as a whole, including the drawings and consideration of the specific embodiments of the invention described in the detailed description.

BRIEF DESCRIPTION OF THE DRAWINGS

The following depict preferred and non-limiting embodiments of the invention, in which.

DETAILED DESCRIPTION OF SOME OF THE PREFERRED EMBODIMENTS OF THE PRESENT INVENTION

Figure 1:
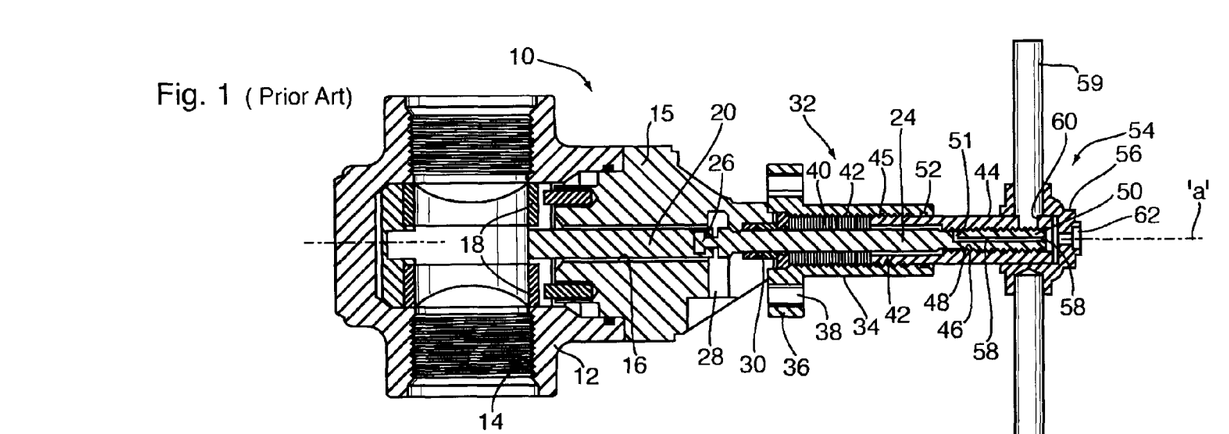
FIG. 1 is a side cross-sectional view of a prior art gate valve typically used in oilfield applications for regulating flow in a conduit, showing such gate valve in the open position.

Referring to FIG. 1, FIG. 1 shows a typical so-called mud valve 10 of the prior art for use in regulating fluid flow through a transverse flow passage 14. FIG. 1 shows such prior art valve 10, namely a gate valve 10, in the open position while FIG. 2 shows the same valve 10 in the closed position.

Valves 10 of the type for which the tool of the present invention is particularly suited to be used in association with are typically used in water, oil, and gas lines, in wellheads, pipelines and manifolds, in abrasive drilling mud applications, in sour gas and crude oil, at pressures up to 15,000 psi (104 mPa) and temperature ranges of −40° F. to 400° F. Such valves 10 are typically employed in oilfield use to regulate flows from production casing of a drilled well, for which typical sizes are of 4½" or 5½" diameter.

Figure 2:
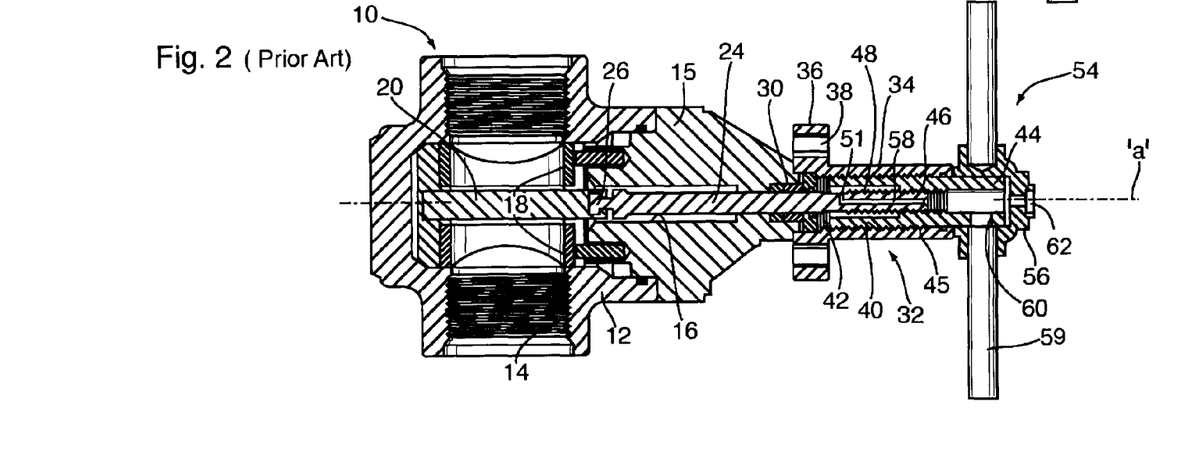
FIG. 2 is a similar cross-sectional view of a prior art gate valve shown in FIG. 1, with such gate valve shown in the closed position.

Prior art valve 10 shown in FIGS. 1 & 2 is a typical gate valve used in aforementioned oil and gas well production manufactured under the trademark Demco® by Cameron International Corporation of Houston, Tex., USA. by GWC Valve International Inc., of Bakersfield, Calif., USA, and National Oil Well Varco of Houston, Tex., USA as well as by other tool manufacturers, some of which are to API 6A standard, for which the present tool and method is particularly adapted.

Valve 10 has a body 12 with a transverse flow passage 14 for which the valve 10 serves to regulate a flow of fluid therein. A bonnet 15 secures to body 12, which bonnet 15 possesses a bore 16 which intersects flow passage 14. Gate member 20 is located within bore 16, and may be moved back and forth to open and close flow passage 14. Specifically, gate 20 moves linearly from the open position shown in FIG. 1 to the closed position shown in FIG. 2, and is located between seat rings 18 which are mounted in flow passage 14 and mounted co-axially on bore 16. As shown in FIGS. 1 & 2 for this particular version of valve 10, a non-rotating rising stem 24 connected to gate 20 by a T-slot coupling 26, permits movement of gate 20. A stem seal 30 seals between bonnet 15 and rising stem 24.

The present invention contemplates use on gate valves 10 that employ non-rotating rising stems 24. Other types of gate valves 10, however, may be used, provided only that such valves 10 have a cylindrical actuator housing 34 (which typically contains rising stems 24, 34) and also a fluid inlet such as a greasing zert inlet 58 and/or flushing cavity 28 which would permit injection of de-seizing fluid and lubrication, and over which the tool 100 of the present invention may be placed over and sealingly engaged therewith to allow injection of such fluids into valve 10 in the manner hereinafter described.

For example, some valves 10, as shown in FIG. 1, may also include a flushing cavity 28 which, with an accompanying fitting (not shown), allows anti-seizing fluids, anti-rust fluids, and/or lubricating fluids to be periodically injected into bore 16. [Parenthetically, such flushing cavity 28 can frequently be a source of ingress of ambient moisture and itself permit such moisture to cause to corrosion and seizure of gate 20 within bore 16].

An actuator 32, having and housing 34 and internal threaded bore 40, secures to bonnet 15. Actuator 32 and internal threaded bore 40 within chamber 42, in combination with rotatable stem 44, together operate in the manner shown (cf. FIG. 1 to FIG. 2) to move non-rotating rising stem 24 along axis 'a' to open and close gate 20. Actuator 32 includes an actuator housing 34 that has an external flange 36 with bolt holes 38 for bolting such housing 34 to bonnet 15.

An externally and internally threaded rotating rising stem 44, having external threads 45, extends into actuator housing bore 34, and external threads 45 thereon engage internal threads 42 in internal threaded bore 40 of actuator 32. Rotating rising stem 44 further possesses internal threads 46. Internal threads 46 are located in an upper portion 49 of the interior of rotating stem 44, which engage external threads 48 on non-rotating rising stem 24.

A grease injection passage 58 (greasing zert) extends within non-rotating rising stem 24 from a distal end 50 of non-rotating rising stem 24 to an outlet port 51 located on a side surface of non-rotating rising stem 24 below external threads 48 thereon. Grease injection passage 58 is normally open. A seal 52 normally seals between rotating rising stem 44 and actuator housing 34, although this seal 52 may become worn and permit incursion of moisture onto threads 45, 42,40 causing corrosion and consequent seizure of movement of rotating rising stem 44, thus preventing opening or closing of valve 20.

A valve handle 54 mounts to the outer end of rotating rising stem 44, and functions to turn rotating rising stem 44. Valve handle 54 has a hub 56 and outward extending spokes 59. One of the spokes 59 has an inner end that extends into a hole 60 in rotating rising stem 44 to cause rotating rising stem 44 to rotate when handle 54 is rotated. Hub 57 has an aperture 62 (grease zerk) to allow grease to be injected into grease zerk passage 58.

As can be seen by comparing FIGS. 1 & 2, rotating handle 54 in one direction causes rotating rising stem 44 to rotate, while non-rotating rising stem 24 and actuator housing 34 do not rotate. The rotation of rotating rising stem 44 causes non-rotating stem 24 to move toward transverse flow passage 14, thereby moving gate 20 to the closed position therein. Rotating rising stem 44 also moves toward transverse flow passage 14, thereby reducing the volume of actuator housing chamber 42. Rotating in the opposite direction causes the reverse to occur.

FIG. 3 shows a prior art de-seizing tool 90 of the type shown in US Pub. 2014/0124298. As may be seen from FIG. 3, prior art de-seizing tool 90 is adapted, after removal of handle 54 from hub 56 of valve 10, to be fixedly attached to the rotating rising stem 44 of valve 10 via a set screw 91.

Tool 90 has a moveable piston 94, which travels in bore 98 of tool 90.

In operation, de-rusting fluid, lubricating oil, or a combination thereof is thereafter flowed into chamber 92 via valve 93, and valve 93 is thereafter closed. Threaded piston 94, having 'o' ring seal 96 on piston head 97 and which was previously positioned via bolts 95a, 95b to allow a substantial volume to chamber 92, is then manually turned using a wrench to cause piston 94 in chamber 92 to reduce the volume of chamber 92, thereby forcing such fluid in chamber 92 into greasing zert (channel) 58 and onto external threads 46 of non-rotating stem 24 and internal threads of rotating rising stem 44 as well as potentially into bore 16, chamber 40, and threads 45 of actuator housing 34.

Disadvantageously, however, if greasing channel 58 of valve 10 is plugged with corroded material, there is no alternative route to deliver de-rusting fluid and/or lubricating fluid to valve 10 and components therein which may have corroded and seized, and to thus un-seize the valve 10. In such instance, depending on the degree of plugging, the pressure of the supplied fluid by piston 94 will likely choose the path of least resistance, and if the pressure drop over seals 75 on tool 90 is less than the pressure required to overcome the obstruction in channel 58, such fluids will undesirably, despite high pressure fluid being provided to channel 58, be forced over seals 75 and out of the tool 90, rather than into channel 58 and into the remainder of the valve 10. In such circumstances with greasing channel 58 obstructed tool 90 is thus ineffective in un-seizing valve 10, and valve 10 will remain seized.

Also disadvantageously, even if perchance channel 58 is clear and unobstructed and thus able to receive an anti-seize fluid or lubrication, if valve 10 is seized in a closed or nearly closed position, in such position rotating rising stem 44 lacks insufficient protrusion from valve housing 34 to allow tool 90 to be physically pinned to rotating stem 44, thus meaning tool 90 is again inoperable to unseize a valve 10 which in such seized condition.

Figure 5:
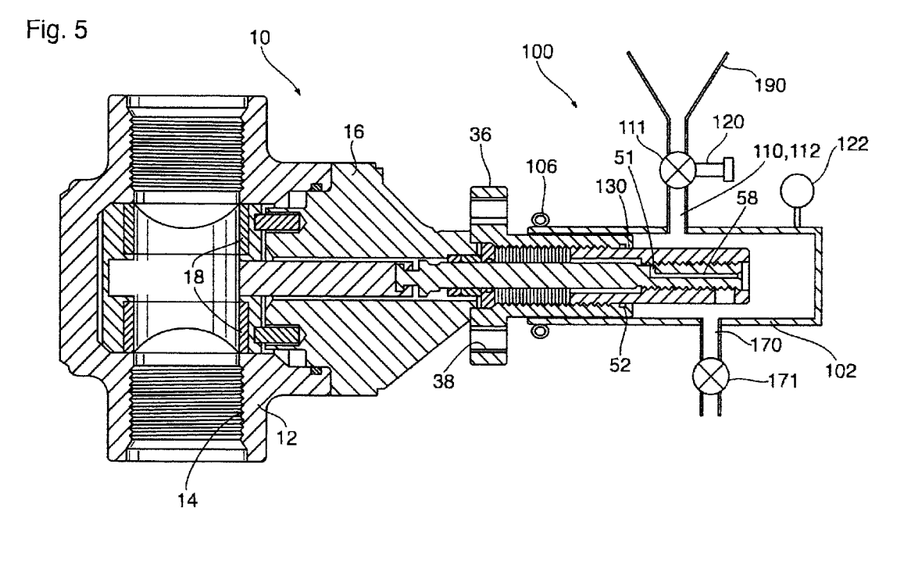
FIG. 5 is a view of the same prior art gate valve, having another embodiment of the tool of the present invention installed thereon.
Figure 6:
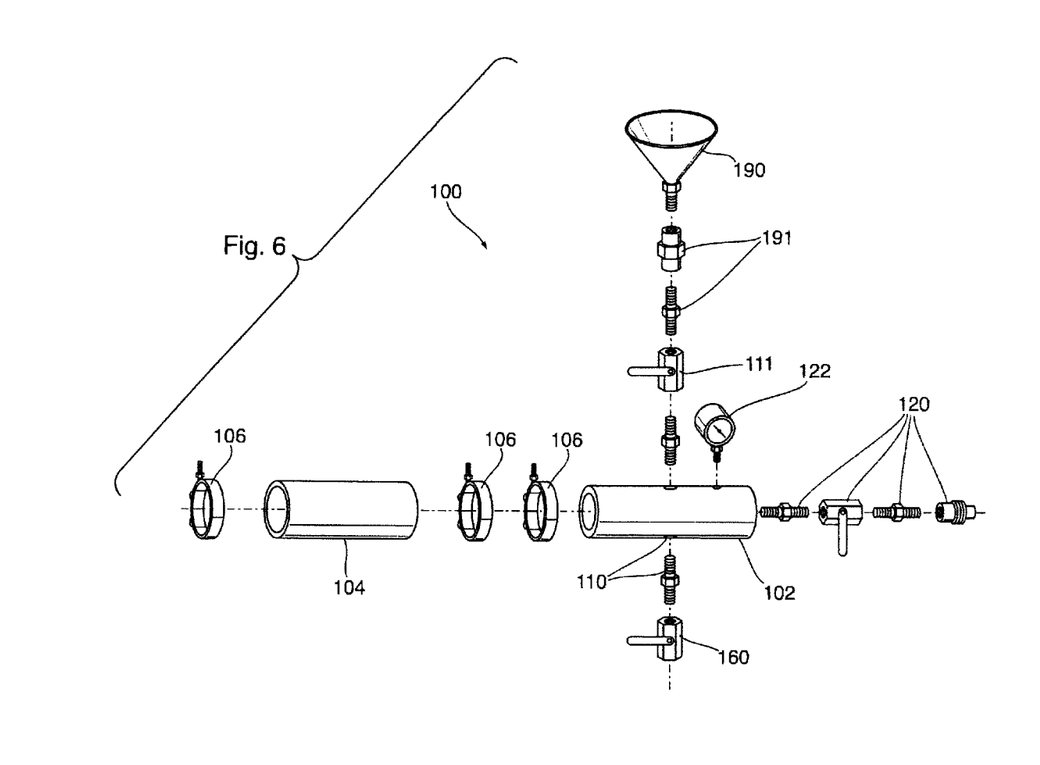
FIG. 6 is an exploded perspective view of one embodiment of the tool of the present invention, showing the components thereof.
Figure 7:
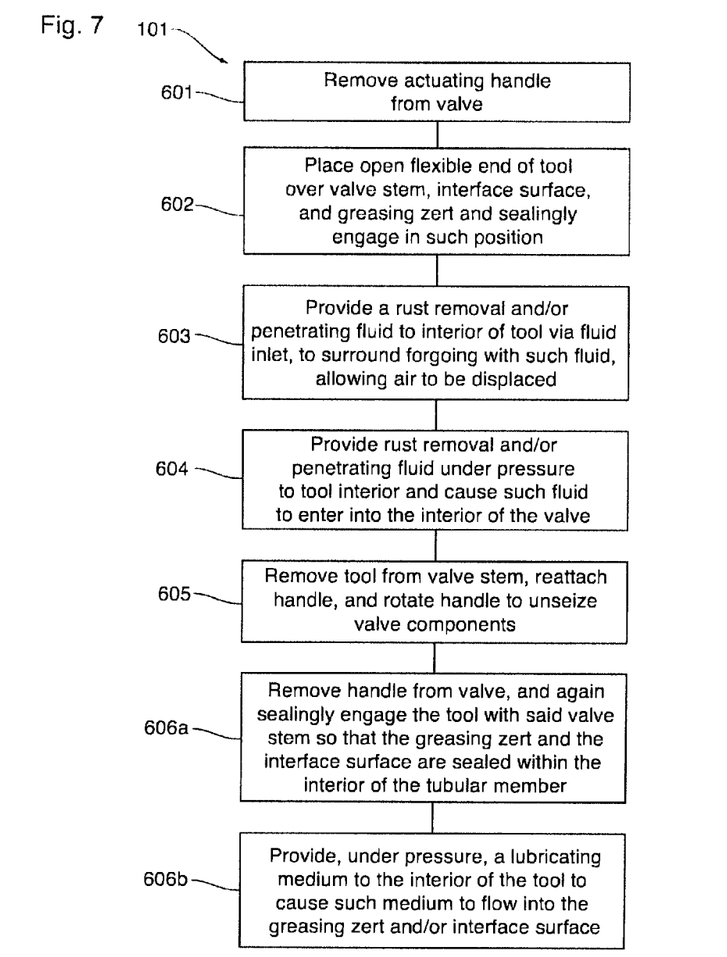
FIG. 7 is flow diagram depicting one embodiment of the method of the present invention for unseizing and lubricating a mud valve.

The tool 100 of the present invention, as shown in various embodiments thereof in FIGS. 4-6 and FIG. 8, and the method 101 of deploying such tool 100 shown schematically in FIG. 7, provides an improved tool 100 and method which, due to the tool 100 configuration and manner of sealingly engaging valve 10, provides for (an) alternative supply route(s) of fluid to seized components of such valve 10.

Tool 100 and the associated method 101 of the present invention is thus able to unseize valves 10 which may otherwise have blocked or obstructed lubrication channel 58.

Figure 8:
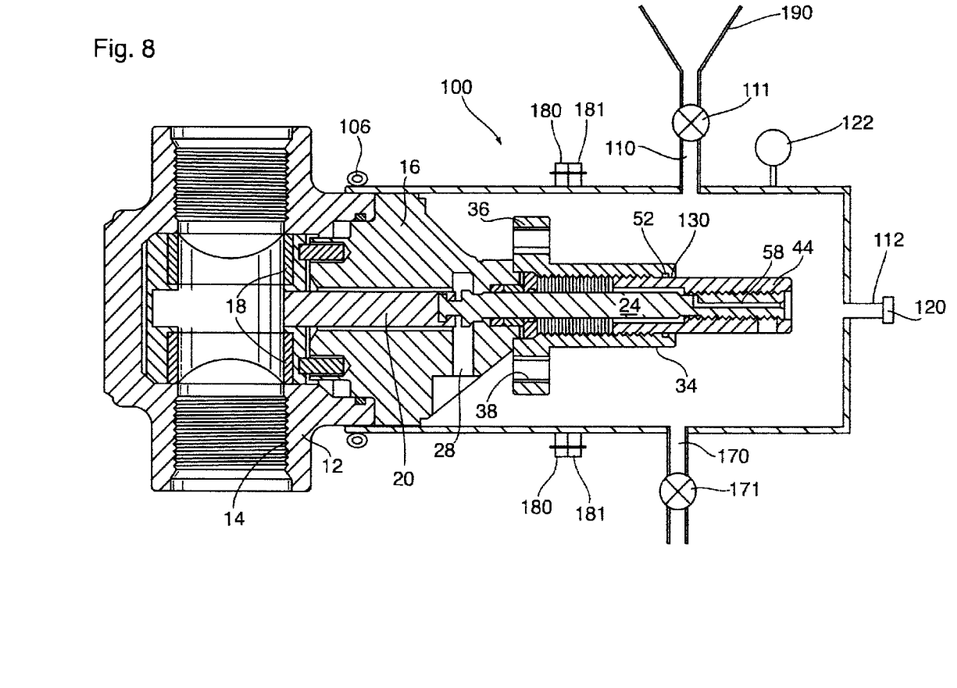
FIG. 8 is a view of another embodiment of the tool of the present invention, configured and adapted for installation in a different manner on a prior art valve but again providing the same advantages as the tool of FIG. 4-6.

FIG. 6 shows an exploded view of the tool 100 of the present invention. FIGS. 4,5 and FIG. 8 show three different embodiments of such tool 100 installed on a valve 10, valve being of a type having an exterior valve stem housing 34 and/or a cylindrical body 12. Such tool 100 is particularly suited for unseizing and/or lubricating a valve 10, and possesses certain advantages over the tool 90 of US Pub. 2014/0124298.

As may be seen from FIGS. 4-6 and FIG. 8, tool 100 comprises a hollow tubular member 102 typically of steel pipe stock, having at one end thereof an open, hollow, cylindrical flexible member 104, typically of vulcanized rubber or the like, which is adapted to be coupled to hollow tubular member 102 such as by screw clamps 106 as shown in FIG. 6, or via mating flange 180, 181 as shown in FIG. 8. Flexible member 104 is adapted to be placed over and contain therewithin a portion of said valve stem/actuator housing 34 or valve body 12 of valve 10. A circumferential tightening member, typically in the form of a screw clamp 106, is provided at a distal end of hollow flexible member 104 to allow sealingly engagement of flexible member 104 to valve body 12 or actuator housing 34. In this regard, screw clamp 106 encircles said one end of said flexible member 104 so as to cause flexible member 104 member at said one end, when placed over said portion of said valve stem/actuator housing 34 or valve body 12 and tightened, to sealingly engage said valve stem/actuator housing 34 or valve body 12 about said outer periphery thereof.

A fluid inlet port 110, having a stopcock 111, is situated along a length of said tubular member 102, and is in fluid communication with an interior of tool 100, specifically with the interior of tubular member 102. Stopcock 111, as shown in FIG. 4, is used to open fluid inlet port to allow ingress of penetrating or lubricating fluid, and to allow egress of air bubbles from interior of tubular member 102 when such fluid enters tool 100. Alternatively, stopcock 111, as shown in FIG. 5, may allow ingress of penetrating or lubricating fluid and egress of air bubbles from interior or tubular member 102 when in a first position, and allow ingress of pressurized fluid into the interior of tool 100 when in an alternative second position. A funnel member 190 is typically provided, preferably with an associated threaded adapter 191, to allow ease of providing penetrating fluid/de-rusting fluid or lubricating fluid (not shown) to fluid inlet port 110.

A pressurized fluid inlet port 112 is situated along a length of tubular member 102 as shown in FIG. 5 where the fluid inlet port 110 and the pressurized fluid port 112 are one and the same, or at an end opposite said one end of tubular member 102 where the fluid inlet port 110 and the pressurized fluid port 112 are separate and discrete ports as shown in FIGS. 4,6 & 8. Pressurized fluid inlet port 112 is provided with adapter coupling 120 to allow coupling of a fluid supply hose (not shown) to tool 100, to thereby supply pressurized fluid (penetrating or de-rusting fluid, and subsequently grease or lubricating fluid) to the interior of tubular member 102.

A fluid drain port 170, and associated stopcock 171, is typically provided on an underside of tool 100, to allow draining of penetrating/de-rusting fluid from the interior of tool 100 upon completion of use of the tool 100 in the manner described below to de-seize valve 10. Drain port 170 is not, however, necessary as fluid will drain from tool 100 when circumferential sealing member (screw clamp 106) is loosened. However, drain port 170 allows for an easier way of collecting such unused fluids, for easy draining into a receptacle (not shown) placed below tool 100 prior to removing tool 100 from valve 10.

In the embodiment shown in FIGS. 4, 6 & 8, a stopcock 114 may further be provided, which when open allows supply of such fluid to interior of tubular member 102 and when closed prevent egress of pressurized fluid from interior of tubular member 102.

A pressure gauge 122 may be provided, to allow an operator of tool 100 to determine pressure of fluid supplied to interior of tubular member 102 and thus to valve 10, and in particular the pressure supplied to: 1) an interface surface 130 on valve 10 existing at seal 52 where rotating rising stem 44 slidably engages actuator housing 34, and likewise 2) the pressure of fluid being supplied to lubrication channel 58.

Advantageously, by means of flexible member 104 sealingly engaging valve 10 in the manner shown in FIG. 4-6 or as shown in FIG. 8, the tool 100 of the present invention is able to provide (an) alternate path(s) for penetrating/de-rusting fluid and/or lubricating fluid to be supplied to interior of valve 10, namely over the surface interface 130 and over seal 52, rather than only via channel 58 in non-rotating rising stem 24 of valve 10.

Even further, in the embodiment shown in FIG. 8, where the valve 10 possesses a flushing cavity 28, the tool 100 in the embodiment shown in FIG. 8 is able to provide a still further alternate route of supplying penetrating or derusting fluid, or lubricating fluid to internal valve components via flushing channel, which may further in addition, or alternatively, then assist in de-seizing any seized components of valve 10.

FIG. 7 is a schematic depiction of one method 101 of operating the tool 100 of the present invention to de-seize and lubricate a mud valve 10.

Such method 101 of using the tool 100, in one of its simplest embodiments, comprises a first step 601 of (i) removing the handle of said valve from said valve 10.

A second subsequent step 602 comprises placing hollow tubular member 102, having at one end an open, hollow, flexible member 104, in sealing engagement over said actuator housing/valve stem 34, said greasing zert channel 58, and said interface surface 130, so that said interface surface 130 and said greasing zert channel 58 are sealed within an interior of said hollow tubular member 102.

A third subsequent step 603 comprises providing a rust removal and/or penetrating fluid to an interior of hollow tubular member 102 and causing said fluid to surround said greasing zert channel 58 and interface surface 130.

A fourth subsequent step 604 comprises providing such fluid under pressure to said interior of said tubular member (via pressurized fluid inlet 120 and causing said fluid to enter said greasing zert channel 58 and/or said interface surface 130 and thereby flow past seal 52 into an interior of said valve 10.

A fifth subsequent step 605 comprises removing tubular member 102 from sealing engagement with said valve stem-actuator housing 34, re-attaching the handle 52 to the valve 10, and rotating the handle 52 to unseize the valve 10.

A sixth and subsequent step 606a and 606b comprises again removing the handle 52, sealingly engaging the tool 100 with the valve 10 in the identical manner described above, and providing, under pressure, a lubricating medium to the interior of said tubular member 102 via the pressurized fluid inlet port 112 and causing said lubricating medium to flow into said greasing cert channel 58 and/or the interface surface by passing over seal 52.

Use of examples in the specification, including examples of terms, is for illustrative purposes only and is not intended to limit the scope and meaning of the embodiments of the invention set out and described in the disclosure. In the specification, the word "comprising" is used as an open-ended term, substantially equivalent to the phrase "including, but not limited to," and the word "comprises" has a corresponding meaning.

The scope of the claims should not be limited by the preferred embodiments set forth in the foregoing examples, but should be given the broadest interpretation consistent The embodiments in which an exclusive property and privilege is claimed are set out in the following claims:

1. A method for unseizing and/or lubricating a valve of a type having a handle, a greasing zert and a valve stem, said valve stem having an interface surface between a stationary portion of said valve stem and a rotatable portion of said valve stem, said method comprising the steps of:
   (i) removing the handle of said valve from said valve;
   (ii) placing a hollow tubular member, having at one end an open, hollow, flexible member, in sealing engagement over a portion of an outer periphery of said valve stem, said greasing zert, and said interface surface, so that said interface surface and said greasing zert are sealed within an interior of said hollow tubular member;
   (iii) providing a rust removal and/or penetrating fluid to an interior of said hollow tubular member and causing said fluid to surround said greasing zert and said interface surface;
   (iv) providing said fluid under pressure to said interior of said tubular member and causing said fluid to enter said greasing zert and/or said interface surface and thereby flow into an interior of said valve;
   (v) removing the tubular member from sealing engagement with said valve stem, re-attaching the handle to the valve, and rotating the handle to unseize the valve; and
   (vi) providing, under pressure, a lubricating medium to said interior of said tubular member and causing said lubricating medium to flow into said greasing zert and/or said interface surface.

2. A method of unseizing and/or lubricating a seized valve of a type having a handle, a greasing zert and a valve stem, said valve stem having an interface surface between a stationary portion of said valve stem and a rotatable portion of said valve stem, said method comprising the steps of:
   (i) positioning the valve in as fully open a position, if possible, and thereafter removing the handle;
   (ii) placing a hollow tubular member, namely one end thereof having an open, hollow, flexible member, in sealing engagement over a portion of an outer periphery of said valve stem, said greasing zert, and said interface surface, so that said interface surface and said greasing zert are sealed within an interior of said hollow tubular member;
   (iii) providing a rust removal and/or penetrating fluid to an interior of said hollow tubular member and causing said fluid to surround said greasing zert and said interface surface;
   (iv) providing said fluid under pressure to said interior of said tubular member and causing said fluid to enter said greasing zert and said interface surface and thereby flow into an interior of said valve;
   (v) removing the hollow tubular member from sealing engagement with said outer periphery of said valve stem, re-attaching the handle, and rotating e the handle so as to close and open the valve to thereby ensure the valve is unseized;
   (vi) rotating the handle to the fully open position, and removing the handle from the valve:
   (vii) pumping grease into said greasing zert.

3. The method as claimed in claim 2, wherein said method after step (vi) further comprises the steps of:
   (a) re-installing the hollow tubular member, namely said one end of the open hollow flexible member and placing said one end in sealing engagement over said portion of said outer periphery of said valve stem, greasing zert, and interface surface; and
   (b) injecting grease into said interior of said tubular member, and causing said grease to be injected into said greasing zert and interface surface.

* * * * *